US005368067A

United States Patent [19]

Cook, Jr.

[11] Patent Number: 5,368,067

[45] Date of Patent: Nov. 29, 1994

[54] GAS STORAGE AND RECOVERY SYSTEM

[75] Inventor: Joseph S. Cook, Jr., Webster, Tex.

[73] Assignee: The United States of America as represented by the Administrator of the National Aeronautics and Space Administration, Washington, D.C.

[21] Appl. No.: 39,602

[22] Filed: Mar. 23, 1993

[51] Int. Cl.[5] .......................... F16K 31/12; B65B 3/12; B65D 33/02

[52] U.S. Cl. ..................................... 137/485; 137/549; 137/571; 137/587; 220/581; 220/901; 141/114

[58] Field of Search ...................... 137/485, 487.5, 549, 137/571, 587; 220/4.12, 565, 581, 901; 141/114

[56] References Cited

U.S. PATENT DOCUMENTS

| | | | |
|---|---|---|---|
| 1,035,238 | 8/1912 | Robinson | 137/549 |
| 1,627,840 | 5/1921 | Donnelly | 137/549 X |
| 3,270,905 | 9/1966 | Kroekel | 220/581 |
| 3,379,208 | 4/1968 | Alleaume | 137/571 X |
| 3,415,273 | 12/1968 | Elbogen | 137/549 X |
| 3,653,220 | 4/1972 | Foster et al. | 62/22 |
| 3,815,327 | 6/1974 | Viland | 55/80 |
| 3,866,474 | 2/1975 | Hasslemann | 141/114 X |
| 4,207,910 | 6/1980 | Müller | 137/571 |
| 4,574,851 | 3/1986 | Lepisto | 141/114 X |
| 4,845,334 | 7/1989 | Stocks et al. | 219/121.59 |
| 5,017,204 | 5/1991 | Gottier et al. | 62/11 |
| 5,018,551 | 5/1991 | Pellisier | 137/571 |
| 5,058,631 | 10/1991 | Grant | 141/114 X |
| 5,080,694 | 1/1992 | Knoblauch et al. | 55/26 |
| 5,090,637 | 2/1992 | Haunschild | 244/97 |
| 5,137,175 | 8/1992 | Kowalski et al. | 141/114 X |

*Primary Examiner*—John Rivell

*Attorney, Agent, or Firm*—Hardie R. Barr; Guy M. Miller; Edward K. Fein

[57] ABSTRACT

A system for recovering and recycling gases is disclosed having, in one aspect, inlet and outlet flow lines and controllers with an inflatable enclosure which, in one aspect, has a series of one or more inflatable rib stiffeners which, in one aspect, are inflatable by the gas to be stored. In one aspect the system does not present gas at an undesirable back pressure to the gas source. In one aspect a filtering relief valve is employed which prevents environmental airborne contamination from flowing back into the system when the relief valve is closing. In one aspect the system is for storing and re-using helium.

18 Claims, 2 Drawing Sheets

GAS STORAGE AND RECOVERY SYSTEM

ORIGIN OF THE INVENTION

The invention described-herein was made by an employee of the United States Government and may be manufactured and used by or for the Government of the United States of America for governmental purposes without the payment of any royalties thereon or therefor.

BACKGROUND OF THE INVENTION

1. Field Of The Invention

This invention is generally directed to an enclosure for gases and in a particular embodiment to an enclosure for helium. It is also directed to gas recovery, storage and recycling systems and, in one aspect, to a system for recovering and recycling helium which provides relatively pure helium while maintaining a relatively constant back pressure.

2. Description Of Related Art

Helium is a natural, non-replenishable resource that is readily naturally available from only one location on Earth. Helium cannot be economically produced by either artificial decay or by extraction from the atmosphere. One known method for capturing and storing a gas involves capturing used helium in a large balloon. The balloon is confined in a storage building to isolate it from environmental effects, particularly wind. However, as the balloon expands with helium, back pressure from the balloon as it fills increases. Also, water vapor from the environment and oil from a compressor used to transfer the helium to a storage tank or to a supply system can contaminate the helium.

U.S. Pat. No. 3,653,220 to Foster describes a process for the recovery of helium from a natural gas flow. This process is used to produce helium from a raw material gas.

U.S. Pat. No. 3,815,327 to Viland shows a hydrocarbon recovery system which collects gaseous vapors, condenses the vapors by refrigeration and dehydrates the vapors. Recovered gasoline is returned to an underground tank and impurities are vented to the atmosphere.

U.S. Pat. No. 4,845,334 to Stocks et al., teaches the capture, purification, and reuse of inert gases. The gases mentioned include argon and helium which are used in process control in plasma furnaces. A plasma furnace is shown having a vented passage to an inlet port of a recycling system. The gas is first cooled and filtered to remove dust, water vapor, and oxygen from the gas. Then an oiled compressor liquefies the gas which is pumped through an oil removing filter to a storage facility for reuse.

U.S. Pat. No. 5,017,204 to Gottier et al., discloses a means of recovering helium from a natural gas feed which is able to produce a crude helium product having three percent helium. The process is not related to recycling of used helium.

U.S. Pat. No. 5,080,694 to Knoblauch et al., discloses the recovery of helium from a natural gas having initial low concentrations of helium. Repeated absorption processes are used to produce helium with a 99.9 percent purity for use in balloons and the like. The recovery system assumes high levels of contamination.

U.S. Pat. No. 5,090,637 to Haunschild teaches a lighter-than-air aircraft having a helium recycling system. The system makes use of a catalytic conversion process which removes oxygen and nitrogen gases from the helium volume to a purity of 98–99 percent. Lift is increased by improving the purity as well as heating the lift gas in the process.

There has long been a need for a gas recycling system which does not contaminate the gas and which provides the gas for re-use in a relatively pure form. There has long been a need for such a system which has a variable volume enclosure and can receive gas in at a low pressure while pumping it out at a relatively high pressure. There has long been a need for such a system that can handle either high or low flow rates. There has long been a need for such systems which do not have undesirably high back pressure levels.

SUMMARY OF THE PRESENT INVENTION

The present invention discloses systems and methods for recovering, storing and recycling gases. In one embodiment helium is collected and stored for re-use. One particular system for accomplishing this has an inlet system intercommunicating with a source of helium(e.g. in one embodiment a test stand vent). Preferably the inlet pressure is maintained, in this embodiment, at about atmospheric pressure (14.7 pounds per square inch absolute, psia). Surfaces which are contacted by the helium are, preferably, decontaminated prior to introduction of the helium into the system. Appropriate piping, valves, and filters may be used at the inlet. The inlet helium flows to a containment enclosure, preferably one of variable volume. Delivery apparatus delivers the gas through an outlet at a relatively high pressure; e.g. in one embodiment about 5000 psia.

In one embodiment of the previously described system the source outlet pressure and enclosure pressure are maintained with a differential pressure which sustains a flow of helium. The enclosure has a liner and its volume is adjusted based on the containment capacity needed for a given flow rate. The liner can be made of any gas impermeable material and is, preferably, a metallic foil, or the like, which reduces contamination as well as reducing helium leakage. A volume control system is controlled dynamically based on overall characteristics of control valve states. The containment system, preferably, uses stiffeners or inflatable pockets, containers, sub-enclosures, or ribs which are inflated by the helium itself which expand or collapse as needed. In one preferred embodiment the inflatable sub-members are inflated with part of the stored gas. A computer controls helium flow into and out of the enclosure and monitors flow data and adjusts the capture system by inflating or deflating the ribs. A storage system purifies and compresses the helium forwarding the recovered gas, e.g. to storage tanks, at a high pressure over a period of time, e.g. one night. A distribution system delivers helium from the storage tank to an exterior location for use, e.g. to a test stand.

In another embodiment a purifier (e.g., a liquid nitrogen coldtrap or a scrubber) is used in the inlet system, to recycle helium during pressure relieving/venting from applications that use helium as a pressurant (e.g., propellant supply systems). The application's fluid vapors remain in the purifier, allowing only helium to be recycled. This minimizes compatibility issues that are caused by the application's fluid vapors reaching the capture system. If required, the inlet system purifier is designed for minimum flow resistance. If the application does not require minimum flow resistance, the inlet system purifier and the invention will be implemented at less cost.

In another embodiment a system according to the present invention is used on vent and relief lines of any gaseous or liquid gas system (e.g., liquid helium cooling systems for vacuum chambers and wind tunnels). Use on liquid helium system may require heating (e.g., using a heat exchanger or a controlled throttling device) the helium above the minimum temperature limit of the inlet and capture systems.

In another embodiment a flow restrictor (e.g., a metering valve or an orifice) in the inlet system is used to recycle helium from systems that require higher back pressures at the application's vent outlet than can be achieved within the capture system.

This invention is directed to systems for handling gases, including but not limited to systems used to recycle oxygen and hydrogen. Recycled gases can be either reused or sold, especially for applications with less stringent purity requirements. Cleanliness requirements are achieved with an appropriate filter.

In another embodiment no volume-control system and rib structure is required if the pressure from captured gas is adequate for expanding an enclosure. The pressure within such an uncontrolled enclosure is higher than that within a controlled enclosure depending on the weight of the enclosure. The pressure within an uncontrolled enclosure increases as the amount of gas captured increases since the captured gas is used to hold up more and more of the enclosure during expansion.

It is, therefore, an object of at least certain preferred embodiments of the present invention to provide:

New, useful, unique, efficient, non-obvious devices and methods for recovering, storing and re-using gas, such as, but not limited to, helium;

Such methods and devices which provide a controlled, variable volume gas enclosure and regulation of inlet pressure into it to capture and store gas, particularly used gas, including but not limited to helium;

Such methods and systems which provide stiffening apparatus for the enclosure to provide added support for it, including but not limited to inflatable stiffeners such as one or more pockets, sub-members or ribs exteriorly or interiorly of a main enclosure compartment. In one aspect the stiffness of the stiffeners may be varied as desired for assisting in controlling enclosure volume and pressure. Having gas under pressure within the enclosure's stiffeners to support the enclosure's weight reduces or minimizes unwanted increases of gas back pressure at a system inlet;

Such methods and devices which provide such systems with an enclosure liner to reduce gas permeation through the enclosure and to reduce or prevent gas contamination by material of or on the enclosure;

Such methods and devices which have one or more low-pressure filtering-relief valves to inhibit or prevent gas contamination;

Such methods and systems which provide gas recycling without adversely affecting apparatus connected either at a system inlet or at a system outlet and a system which can accommodate a wide range of flow rates and pressures;

Such methods and systems which are able to utilize relatively smaller and/or less expensive compressors, due to the use of a variable volume enclosure, for compressing gas into storage tanks; and A filtering relief valve useful in such systems and methods.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or addition of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope for the invention may admit to other equally effective or equivalent embodiments.

FIG. **3*a* is a side cross-section view along line 3*a*—3*a* of Fig. 3*b* of a filtering valve according to the present invention.

DESCRIPTION OF EMBODIMENTS PREFERRED AT THE TIME OF FILING FOR THIS PATENT

Figure 1:
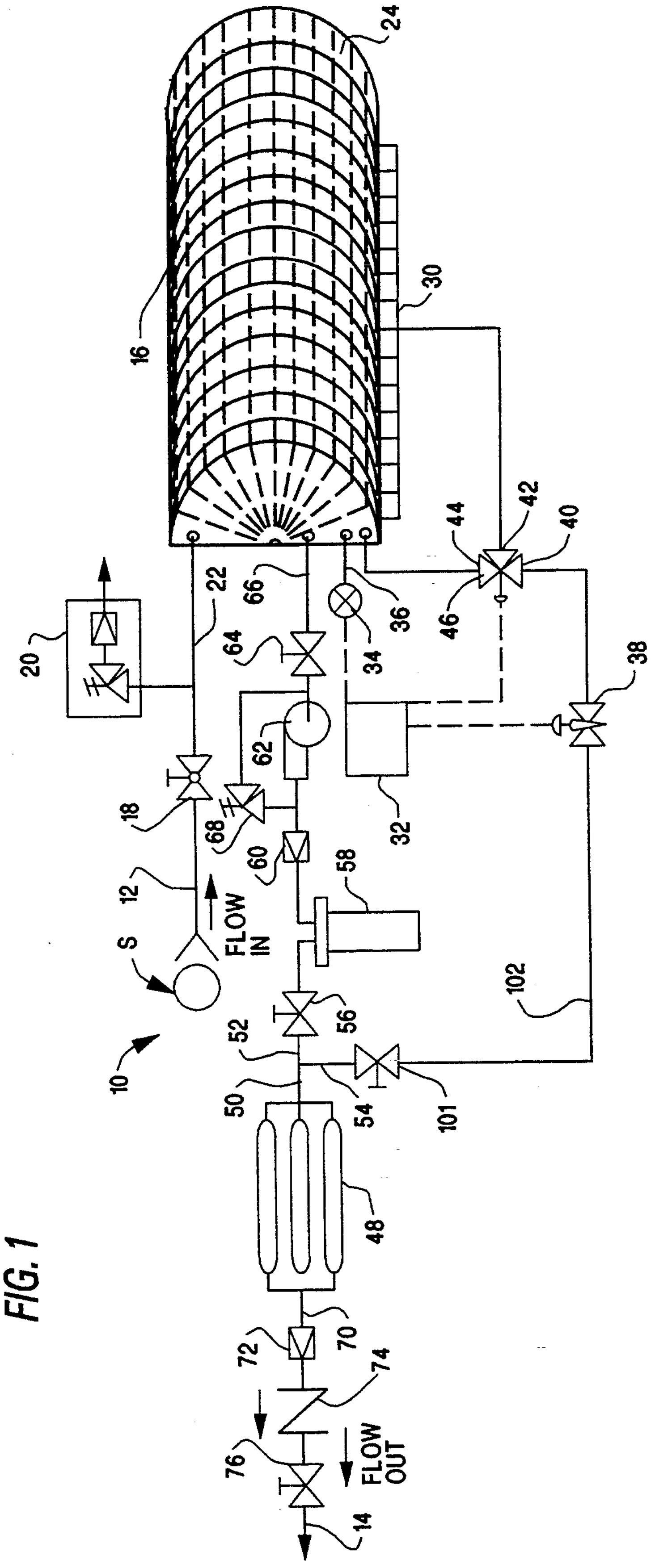
FIG. 1 is a schematic view of a system according to the present invention.

Referring now to FIG. 1, a system 10 according to the present invention receives inlet gas in a flow line 12. The flow of inlet gas, e.g. helium, is controlled by a valve 18, preferably a low-flow-resistance isolation valve, such as a ball or butterfly valve. Another valve 20, preferably a low-pressure filtering relief valve, assures that the enclosure does not become over pressurized and prevents particulates from contaminating the enclosure via the relief valve. Gas flows from the line 22 into an enclosure 16. If pressure in the enclosure reaches a pre-set level, e.g. 20 psia, the relief valve 20 opens, venting the enclosure to the atmosphere.

The enclosure 16 includes a main inflatable member 24, a liner 26, and a plurality of inflatable stiffening ribs 28. Gas is introduced into individual ribs 28 through a manifold 30 and gas is exhausted into the enclosure 16 through the same manifold as controlled by a three-way valve 44. If desired, the enclosure may be tied down to some type of anchor or secure structure. When the gas stored is helium, the enclosure's walls are, preferably made of materials with low-helium-permeability and low-impurity-releasing (e.g., plasticizers) characteristics. The enclosure is designed (e.g. wall thickness) according to the selected materials and the maximum pressure.

The liner 26 prevents impurities from the environment from entering the enclosure and inhibits the introduction of contaminants from the enclosure material from entering the recycled helium. The liner also helps reduce the permeation rate of helium through the enclosure walls. The liner is preferably made from a metallic foil or metallized plastic attached to the inner surface of the enclosure or some type of metallic molecules deposited on the internal surface of the enclosure. In one embodiment the enclosure material is Mylar (TM) material with a deposited aluminum liner. In another embodiment no liner is used, e.g. when the enclosure is made from a suitable material for which no liner is needed (e.g. nylon 6).

The enclosure can be any shape that expands easily. The enclosure 16 has a semi-cylindrical shape as shown in FIG. 1. The amount of volumetric expansion is designed according to the amount of gas used in the application and in the volume-control system. In one case, the enclosure expands at least 65,000 cubic feet (cf); i.e., 60,000 cf for the maximum amount of helium vented from a helium source in one working day and 5000 cf for the helium used for controlling the enclosure volume.

In one preferred embodiment a system 10 according to this invention recycles 99.990% pure, particulate-free helium (that meets MPS helium requirements according to NASA's Space Shuttle Program Specification Space Shuttle Fluid Procurement and Use Control, SE-S-0073) from a Main Propulsion Subsystem ("MPS") helium test stand by attaching the system as shown in FIG. 1 to test stand vents S via the line 12 and either to a facility helium supply system or to a transfer tank (not shown) via a line 14. The recycling system 10 does not affect the test stand because the system 10 is designed with an enclosure 16 to maintain vent outlet pressure either near 14.7 psia or below a maximum back pressure which the test stand can tolerate without affecting performance. To maintain helium purity and cleanliness requirements, all component surfaces in the recycling system that are exposed to helium from the test stand are, preferably, cleaned and maintained to Level 100 (per MPS helium system requirements in SE-S-0073) before installation.

A controller 32 interconnected between a pressure transducer 34 which senses interior pressure within the enclosure 16 via a line 36 can increase enclosure volume by pressurizing the ribs 28 through a proportional valve 38 or pressure regulator through a normally open port 40 and a cylinder port 42 of a three-way valve 44 and via the rib structure feed manifold 30. As the rib structure is pressurized, its stiffness increases, raising the enclosure and increasing volume. The controller decreases enclosure volume by depressurizing the rib structure through the rib structure feed manifold 30, the cylinder port 42 and a normally closed port 46 of the three-way valve 44, and the lines leading into the enclosure. As the rib structure is depressurized, its stiffness decreases, lowering the enclosure and decreasing volume. During depressurization of the rib structure, helium is also recycled from the rib structure into the enclosure.

In another embodiment, other control system designs are used as long as vent outlet and enclosure pressures are maintained within correct design limits for all flow rates vented from the gas source, e.g. the test stand. For example, pressurization and depressurization of the rib structure could be accomplished by replacing the three-way valve 44 with a two-way valve (not shown). In this case the proportional valve 38 or pressure regulator is directly connected to the rib structure feed manifold. The rib structure feed manifold is connected to the two-way valve for discharging helium into the enclosure during depressurization. However, the three-way valve is an additional safety feature because it isolates the rib structure from the storage tanks if the metering valve or pressure regulator fails open.

In the particular embodiment shown in FIG. 1, the control valves, rib structure feed manifold, and tubing are designed (e.g., flow coefficients) for the volumetric expansion rate of the enclosure to be at least 1896 cfm, which is the maximum standardized flow rate from the MPS test stand. It is preferred for certain other preferred embodiments of this invention that the enclosure and related devices be designed to handle a known maximum flow rate and volume which the system will encounter. Since the system 10 design utilizes the fast flowing characteristics of helium for assistance in controlling the stiffness of the rib structure, volume control response is more than adequate while component size is minimized. Helium for controlling the stiffness of the rib structure may be provided from one or more storage tanks 48, which are preferably partially filled before the first use of the enclosure through two lines 50 and 54, through a valve 101, and thence via a line 102 to a valve 38. The amount of helium for the partial fill depends on the pressure, temperature, and volume within the rib structure.

The control system regulates enclosure pressure at a required level by changing the volume of the enclosure according to the ideal gas law (or other laws depending on the design pressure and temperature in the enclosure). The volume-control system that includes the controller 32, the ribs 28, the control valves 38 and 44, the ribs feed manifold 30, and the pressure transducer 34 monitors enclosure pressure and adjusts enclosure volume as required to maintain the correct enclosure pressure by regulating the stiffness of integral ribs. The controller 32 can be either a computer or a pneumatic logic circuit that commands the control valves based on input from enclosure pressure. It is within the scope of this invention to have a system as described with no stiffening members and no controller.

Helium stored in the enclosure 16 flows through a line 66, to an isolation valve 64, to a compressor 62, preferably a non-contaminating compressor, by a relief valve 68, which discharges to the suction side of the compressor, through a particulate filter 60, through a purifier 58, through an isolation valve 56, and thence via lines 50 and 52 to the storage tanks 48. The weight of the enclosure 16 helps to compress gas introduced therein.

In the embodiment shown in FIG. 1, the compressor 62 is a 4000 standard cubic feet per hour (scfh) diaphragm compressor which minimizes contamination while evacuating the enclosure overnight through a line 66 and a valve 64. The purifier 58 is, preferably, a liquid nitrogen coldtrap for removing water vapor and other impurities with freezing temperatures about 77 degrees Kelvin or higher, (e.g., non-volatile residue (NVR)).

The filter is, preferably, a porous metal type which is finer than the application's 100 micrometer-absolute cleanliness requirement. The storage tanks are greater than or equal to about 525 cf in wet volume with a maximum available working pressure (MAWP) greater than or equal to 2000 psia. Gas flowing from the storage tanks in a line 70 is filtered by a particulate filter 72. A check valve 74 protects the tanks from contamination and an isolation valve 76 controls outlet flow to the line 14.

Figure 2:
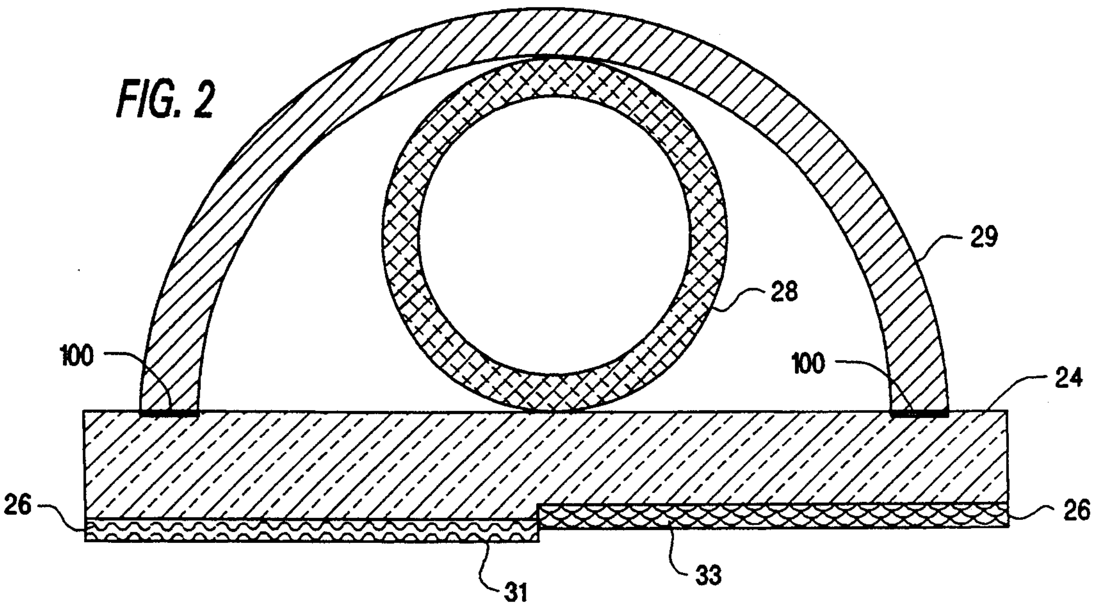
FIG. 2 is an end cross-section view of an inflatable rib for an enclosure according to the present invention.

A cross section of one rib in the rib structure is shown in FIG. 2. The rib 28 supports the enclosure through an attachment 100 between the rib cover 29 and the main inflatable member 24. The attachment 100 can be any appropriate attachment that withstands the design stresses over the life of the invention. The rib 28 is a flexible tube that is designed to contain the maximum pressure required to expand the enclosure. Pressurizing the tube stiffens the rib structure, increasing enclosure volume. Instead of using an external rib structure with an internal liner, the enclosure can use other designs (e.g., using an internal liner to hold an internal rib structure to the enclosure) as deemed favorable. Numerals 31 and 33 represent different possible materials or coatings for a liner 26. A metallized plastic liner 31 may be used or a deposited metal liner 33 may be used; or a combination thereof. If the rib or other structure is bonded to the enclosure or made integrally thereof, no attachment 100 is needed. In another embodiment the ribs may be formed integrally of the enclosure's inflatable member.

Other designs for varying enclosure volume and supporting enclosure weight can be used as long as vent outlet and enclosure pressures are maintained within the correct design limits for all flow rates vented from the test stand. For example, if the enclosure is too heavy to be supported by the rib structure and the pressure within the enclosure, auxiliary support structures can be designed to help support the enclosure (e.g., exterior buttresses or telescoping cylinders actuated with recycled helium).

Figure 3A:
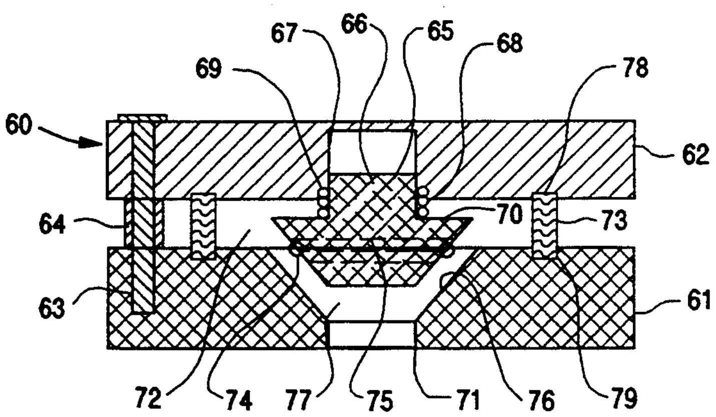
FIG. 3*b* is a top view of the valve of FIG. 3*a***.
Figure 3B:
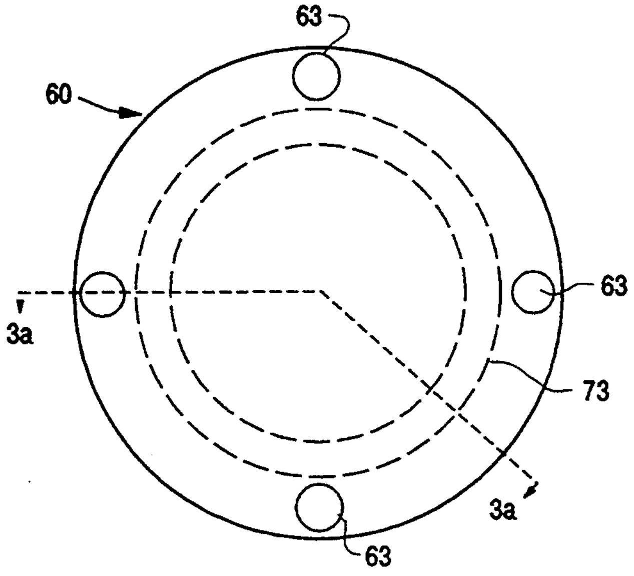

A valve 60 according to the present invention as shown in FIGS. 3*a* and 3*b* is preferable for the filtering relief valve 20 shown in FIG. 1. The valve 60 has a base 61 and a cap 62 which are secured together in spaced apart relation by a plurality of bolts 63 and spacers 64. A spring loaded poppet 65 has an end 66 disposed in a recess 67 in the cap 62. A spring 68 is biased against a shoulder 69 on the cap 62 and against a shoulder 70 of the poppet 65. Gas flowing into a relief inlet 71 flows, when the poppet is raised so that the valve is open to flow, into a space 72 between the cap 62 and the base 61 and through a circumferential filter 73 before it exits the valve. An o-ring 74 around a nose 75 of the poppet 65 provides for a good seal of the poppet 65 against a surface 76 of a recess 77 configured to receive the poppet nose 75. Any conventional appropriate filter media may be used for the filter 73 and any appropriate shape (in addition to circular as viewed from above) may be used within the scope of this invention. Porous metal type filters are useful for the filter media. Seating area for the nose 75 is, preferably maximized to minimize setting tolerance and to maximize relief capacity. Portions of the filter 73 extend into both a recess 78 in the cap 62 and a recess 79 in the base 61 for sealing securement of the filter 73 between these two members. The filter inhibits or prevents system contamination while the poppet is closing.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A gas storage system comprising
- an inflatable variable volume enclosure for holding the gas,
- the enclosure having an inlet through which gas flows into the enclosure from a gas source,
- a pressure maintenance means comprising a venting relief valve between the inlet and the enclosure for maintaining a desired pressure of gas on the inlet from the enclosure, and
- the enclosure having an outlet through which gas stored in the enclosure flows from the enclosure.

2. The system of claim 1 wherein
- the venting relief valve filters gas flowing therethrough.

3. The system of claim 2 wherein the venting relief valve comprises
- a base with a gas flow channel therethrough,
- a cap member spaced apart from and secured to the base for gas flow therebetween,
- a movable poppet movably mounted in a poppet recess in the cap member, the poppet movable to close off flow through the gas flow channel of the base, and
- a filtering means disposed between the base and the cap member for filtering gas flowing therebetween.

4. The system of claim 3 wherein in the venting relief valve
- a plurality of bolts secure the cap member to the base in spaced apart relation and
- the filtering means comprises a filter element extending circumferentially around an opening of the gas flow channel in the base and is sealingly mounted in recesses in both the base and in the cap member.

5. A gas storage system comprising
- an inflatable variable volume enclosure for holding the gas,
- the enclosure having an inlet through which gas flows into the enclosure from a gas source,
- a pressure maintenance means between the inlet and the enclosure for maintaining a desired pressure of gas on the inlet from the enclosure,
- the enclosure having a plurality of stiffening elements formed therein or secured thereto, and
- the enclosure having an outlet through which gas stored in the enclosure flows from the enclosure.

6. The system of claim 5 wherein
- the stiffening elements are a plurality of inflatable ribs secured to the enclosure, each rib having a gas flow opening and inflatable by gas from a gas source.

7. The system of claim 6 wherein
- a gas manifold intercommunicates with the enclosure through which gas flows to and from the inflatable ribs.

8. The system of claim 5 including also gas purification means communicating with the enclosure for purifying gas flowing out from the enclosure.

9. The system of claim 7 including also control means in communication with the enclosure and the gas manifold for controlling gas flow to and from the inflatable ribs to thereby control volume of the enclosure, the control means having a pressure transducer for sensing interior pressure in the enclosure and at least one control valve for regulating gas flow to and from the inflatable ribs.

10. The system of claim 9 wherein the at least one control valve selectively permits gas flow either to the gas manifold from a gas storage device or from the gas manifold to the enclosure.

11. The system of claim 9 wherein gas for inflating the inflatable ribs is provided from at least one gas storage tank in communication with the gas manifold through a secondary gas flow line, and the control means controlling flow through the secondary line.

12. The system of claim 5 wherein the enclosure has a metallized plastic liner.

13. The system of claim 6 wherein an attachment member disposed over each inflatable rib holds each rib on the enclosure, each attachment member secured to the enclosure, a portion of an exterior of the enclosure's surface and a portion of the interior of the attachment member defining a space containing an inflatable rib and in which the rib is permitted to inflate.

14. The system of claim 5 wherein the enclosure is generally semi-cylindrical in shape.

15. The system of claim 5 wherein the gas is helium.

16. The system of claim 5 including at least one gas storage tank in communication with the outlet of the enclosure, and a gas compressor disposed between the outlet and the at least one gas storage tank for providing compressed gas to the storage tank.

17. A gas storage system comprising an inflatable variable volume enclosure for holding the gas, the enclosure having an inlet through which gas flows into the enclosure from a gas source, a pressure maintenance means between the inlet and the enclosure for maintaining a desired pressure of gas on the inlet from the enclosure, control means for controlling volume of the enclosure and back pressure at the inlet, and the enclosure having an outlet through which gas stored in the enclosure flows from the enclosure.

18. A gas storage system for storing helium gas, the system comprising an inflatable variable volume enclosure generally semi-cylindrical in shape with a gas inlet through which gas flows from a gas source having a plurality of stiffening ribs secured thereto, each rib having a gas flow opening and inflatable by gas flowing into the enclosure through the inlet, the enclosure having a metallized plastic liner, a pressure maintenance means between the inlet and the enclosure for maintaining a desired pressure of gas in the enclosure, the pressure maintenance means comprising a venting relief valve, a gas manifold intercommunicating with the enclosure and with gas storage tanks, and through which gas flows to and from the ribs, control means for controlling volume of the enclosure and back pressure at the gas inlet and disposed in a gas flow line from the enclosure to the gas storage tanks, and for controlling gas flow to and from the ribs, the control means having a pressure transducer for sensing interior pressure in the enclosure and control valves for regulating gas flow to and from the ribs, the control valves selectively permitting gas flow either to the gas manifold from the storage tanks or from the gas manifold to the enclosure, and the enclosure having an outlet for gas flow from the enclosure.

* * * * *